Feb. 7, 1939.  F. W. MERRILL  2,146,588
PERMANENT MAGNET STRUCTURE
Filed Sept. 14, 1937  2 Sheets-Sheet 1

Inventor:
Frank W. Merrill,
by Harry E. Dunham
His Attorney.

Feb. 7, 1939. F. W. MERRILL 2,146,588
PERMANENT MAGNET STRUCTURE
Filed Sept. 14, 1937  2 Sheets-Sheet 2

Inventor:
Frank W. Merrill,
by Harry E. Dunham
His Attorney.

Patented Feb. 7, 1939

2,146,588

UNITED STATES PATENT OFFICE 2,146,588

PERMANENT MAGNET STRUCTURE

Frank W. Merrill, Fort Wayne, Ind., assignor to General Electric Company, a corporation of New York Application September 14, 1937, Serial No. 163,794

7 Claims. (Cl. 171—209)

My invention relates to the structure of permanent magnets, particularly magnets for use in dynamo-electric machines where the magnet is shaped somewhat like a pulley with annular pole pieces of large diameter at the ends connected by a smaller diameter yoke section. Magnets of this general shape are desirable for use within the rotor element of inductor type dynamo-electric machines although the magnet need not necessarily rotate. This shape is not very satisfactory for the design of permanent magnets since the area of the flux path at the middle section of the magnet which is at the point of smallest diameter is materially restricted as compared to the area of the flux path near the pole pieces. Moreover, the relative dimensions of such a magnet which are most suitable from the standpoint of permanent magnet design are not dimensions which would be the most suitable from the standpoint of best dynamo-electric machine design as will be explained more in detail later.

It is the primary object of my invention to provide a permanent magnet structure of the general shape mentioned above which is more satisfactory as regards both permanent magnet design and dynamo-electric machine design than permanent magnets that have heretofore been used for this general purpose. In carrying my invention into effect I greatly increase the flux-carrying capacity of the restricted portion of the magnet per unit of area by including soft steel or the like at this point in the magnet structure. By this expedient I can provide an improved magnet both as regards its magnetic strength and as regards its shape and dimensions for dynamo-electric machine purposes. The cost of material is reduced and the interior of the magnet, being made of soft steel, is more easily machined than heretofore.

The features of my invention which are believed to be novel and patentable will be pointed out in the claims appended hereto. For a better understanding of my invention reference is made in the following description to the accompanying drawings wherein Fig. 1 represents my improved permanent magnet partially in section as included in the rotor element of a dynamo-electric machine.

Figure 1:
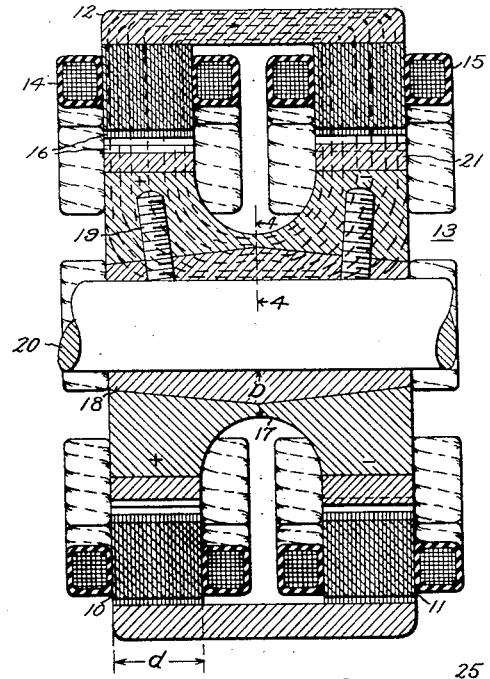

In Fig. 1, I have shown a portion of a dynamo-electric machine which may be a motor of the synchronous inductor type of the general character described in copending application Serial No. 91,942, filed July 22, 1936 to Welch, or in my copending application Serial No. 91,923, filed July 22, 1936 and assigned to the same assignee as the present invention. The motor has two axially spaced stator sections 10 and 11 having their outer peripheries joined by a magnetic shell 12 and the permanent magnet rotor 13 is provided to produce a unidirectional flux through the two stator elements and the magnetic shell in series. The stator elements are provided with alternating current windings indicated at 14 and 15 and both stator and rotor may be provided with cooperating teeth 16 at the air gap. The details of the stators and of the teeth are not important from the standpoint of the present invention which concerns the structure of the permanent magnet. The permanent magnet is made up of two parts 17 and 18. The part 17 is of a high coercive force permanent magnet material and the part 18 is of soft steel or some other good magnetic material of the soft iron class which has a high flux-carrying capacity per unit area as compared to the flux-carrying capacity of the permanent magnet material used.

In forming this structure the inner tubular part 18 may be placed in a mold preferably with a suitable number of outwardly projecting bolts 19 screwed therein and the permanent magnet material 17 then cast welded thereto. The bolts 19, if used, are preferably, although not necessarily, made of non-magnetic steel and are intended to serve for fastening the parts together more securely.

It is evident that the uniform diameter bore for the shaft shown at 20 may be more easily finished where the soft steel part 18 is employed than would be the case if the hard permanent magnet material were used next to the shaft. The annular polar surfaces at the outer extremities of the magnet may be ground-finished if that is necessary and where these polar surfaces are to be provided with teeth separate toothed rings 21 of suitable magnetic material may be shrunk on to the pole faces.

The structure comprising parts 17 and 18 is permanently magnetized with opposite poles at the end peripheral portions of large diameter as indicated by the + and − signs.

Figure 3:
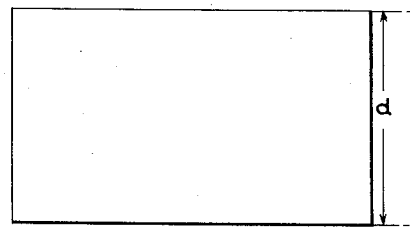
Figs. 3 and 4 are different views of a sector portion of such magnet for the purpose of comparing the cross-sectional areas at different portions of the magnet.
Figure 4:
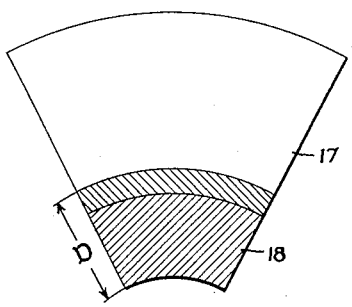

Previous magnets of this general design have been made of all permanent magnet material. The design was poor both from the standpoint of the permanent magnet and from the standpoint of rotor dimensions. The main difficulty in making this type of permanent magnet of all permanent magnet material was due to the fact that the cross-sectional area of the flux path throughout the magnet was far from being uniform even where the rotor diameter has been increased to provide a greater depth of material at the point of restriction indicated at D. This fact will become more apparent from a consideration of Figs. 3 and 4. Fig. 4 represents an enlarged sector of the permanent magnet structure comprising parts 17 and 18 of Fig. 1 as viewed in an axial direction when cut in section on line 4—4 of Fig. 1. Fig. 3 represents the pole face area of this sector drawn to the same dimensions.

It is seen that through the middle neck or yoke section having the dimension D the magnet is restricted in area as compared to the pole face area very materially. That is, the cross-sectional area at D is less than one-fourth the cross-sectional area at the pole face. The difference in area at the different points may of course be reduced by making the dimension D relatively greater and making the width d of the pole face less. However this will tend to increase the diameter of the rotor and unduly narrow the pole face dimension d and is not in the direction of good dynamo-electric machine design. To the extent that such change in dimensions would shorten the length of the flux path of the permanent magnet and render its poles less prominent such change would also be detrimental to good permanent magnet design.

The area and character of the flux path at D should be such as to carry all of the permanent magnet flux that a well-designed and properly magnetized permanent magnet of the shape shown can produce. If the area at D is allowed to become saturated it reduces the permanent flux-carrying capacity of the magnet accordingly, the permanent magnet properties of the pole portions of the magnet will not be fully utilized and the flux density at the air gap will be low. It should, therefore, be clear why a permanent magnet conforming to the general shape and dimensions of my improved permanent magnet but made entirely of permanent magnet material would be poorly designed and inefficient.

According to my invention the restricted area portion of the magnet has its flux-carrying capacity very materially increased by using the soft core part 18 having a higher permeability and higher flux-carrying capacity below saturation than the permanent magnet material 17 with which it is used.

I prefer to leave some of the permanent magnet material at this point of least-cross-sectional area as indicated. This makes a stronger and more solid mechanical structure than if the permanent magnetic material were cast in separate pole piece sections. The core part 18, however, has the greatest cross-sectional area at this point. The high flux-carrying capacity core part 18 preferably extends the entire axial length of the magnet. It gathers the greater portion of the permanent magnetic flux from one annular pole piece and efficiently transfers it to the other annular pole piece. The average length of the flux path is desirably increased somewhat and the flux enters and leaves the pole pieces in a more nearly radial direction than would be the case with a conventional magnet of the same shape and dimensions.

Permanent magnet material such as used at 17 is appreciably higher in cost than is the mild steel part 18. Hence the structure results in a saving in cost of material both by reason of this fact and also because less total material is necessary to produce this magnet as compared to an equivalent permanent magnet of all permanent magnet material. Some reduction in weight is achieved and a smaller diameter rotor with wider pole pieces is possible by reason of this invention.

Figure 2:
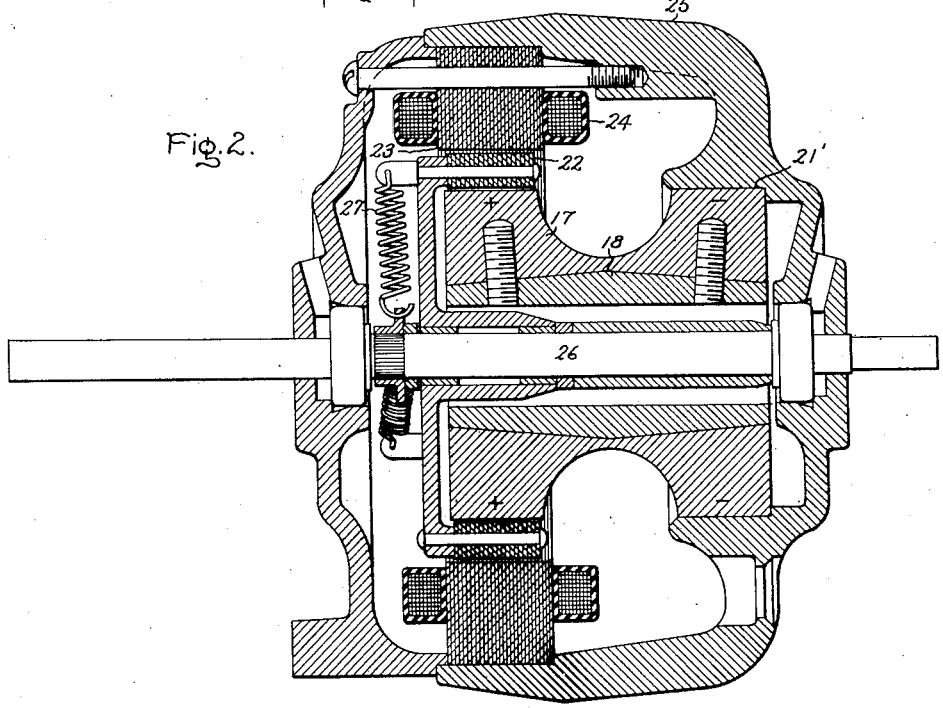
Fig. 2 shows the improved permanent magnet partially in section as used in a dynamo electric machine where the magnet is stationary.

The machine shown in Fig. 2 illustrates the permanent magnet of my invention as part of the stationary structure. The magnet is similar to that shown in Fig. 1 but the pole piece rings 21 of Fig. 1 are not used. Instead one annular pole piece is fitted into the stator part at 21', and the other annular pole piece extends within the inner periphery of a laminated magnetic rotor shell 22. The stator laminations are shown at 23, the stator winding at 24 and the stator shell of magnetic material which completes the permanent magnet flux circuit is shown at 25. The rotor shaft 26 extends through the bore of the magnet without touching the same. The rotor part 22 has a bearing on shaft 26 and is secured in resilient driving connection therewith by springs, one of which is shown at 27.

Figure 5:
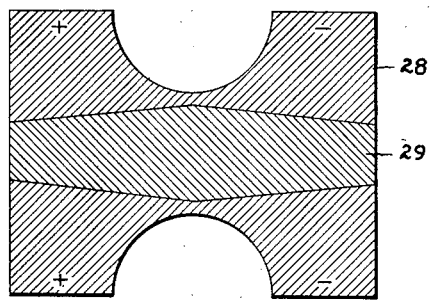
Fig. 5 represents a further modification of the invention where the soft iron core portion is made solid instead of tubular.

The path of flux of the permanent magnet is from the pole marked + across a narrow concentric gap to the inner periphery of the rotor 22 across another concentric gap to the stator 23 through the stator frame 25 to the point 21 and then into the opposite pole of the permanent magnet. The inner periphery of the rotor will be smooth but its outer periphery and the inner periphery of the stator will generally be provided with teeth to produce synchronous inductor motor operation. The shaft structure should be of non-magnetic material.

Where it is unnecessary to carry a shaft through the magnet or where the magnet is used for some purpose other than for dynamo-electric machines the core part which is connected in parallel with the restricted yoke part of the permanent magnet may be made as a solid core instead of being made tubular. This is shown in Fig. 5 where 28 represents the permanent magnetic material and 29 the soft iron core material. In this case the overall diameter may be still further decreased without sacrificing good design features.

In the designs illustrated it will be noted that the core part 29 of Fig. 5 and 18 of Fig. 1 are of larger external diameter at the center or yoke point of the structure than at the ends. This contributes to good design since the core part carries the maximum number of flux lines at this point and it is permissible to taper its cross-section toward the ends. Only sufficient core material is required at any point to carry the extra flux between the pole pieces without saturation. The flux density in the core part may be carried well up towards saturation point without detriment but the core should not be of such restricted dimensions as to fail to provide a reasonably low reluctance path for all of the permanent magnet flux of the pole piece sections which they are capable of producing when all of the permanent magnet material is being utilized efficiently.

The principles herein explained may be utilized in any case where a permanent magnet structure has a restricted yoke section and the invention is not intended to be confined to the particular pulley-shaped magnet structure illustrated.

In accordance with the provisions of the patent statutes, I have described the principle of operation of my invention together with the apparatus which I now consider to represent the best embodiment thereof but I desire to have it understood that the apparatus shown is only illustrative and that the invention may be carried out by other means.

What I claim as new and desire to secure by Letters Patent of the United States is:

1. A permanent magnet structure comprising a pair of axially spaced annular pole piece portions connected by a neck portion of smaller diameter than the annular pole piece portions, said structure comprising an inner axial core portion of soft steel surrounded by permanent magnet material, said structure being permanently magnetized to provide poles of opposite magnetic polarity at the two annular pole piece portions, the inner core portion of soft steel being dimensioned to carry the greater portion of the permanent magnet flux between the pole pieces without saturation.

2. A pulley shaped permanent magnet structure, the structure being permanently magnetized such that the annular end sections of largest diameter are of opposite magnetic polarity, the greater portion of the annular end sections of said structure which are of largest diameter being made of a high coercive force permanent magnetic material and the greater portion of the central connecting section of said structure which is of smallest diameter being made of a softer magnetic material of high flux carrying capacity, both of such materials extending throughout the axial length of the pulley shaped structure.

3. A permanent magnet structure having the general shape of a pulley with annular end sections of large diameter connected by a central neck portion of smaller diameter, said structure being formed of a soft magnetic material central core portion extending axially through the structure and permanent magnetic material surrounding such core portion, the soft magnetic material core portion having its largest cross-sections at the neck portion of said structure and the permanent magnetic material having its smallest cross-section at the neck portion of said structure, the structure being permanently magnetized with opposite poles at the peripheries of the two annular end sections of largest diameter, the soft core material serving to carry the greater portion of the magnetic flux between the pole pieces without express saturation when the permanent magnetic material in the end sections of largest diameter is substantially fully and efficiently magnetized and utilized as permanent magnet material.

4. A permanent magnet structure having the general shape of a pulley with large annular end sections connected by a smaller diameter neck section, said structure being formed of a central tubular axial core part of soft magnetic material of high flux carrying capacity surrounded by permanent magnetic material, the inner diameter of the tubular core part being uniform and its outer diameter increasing uniformly from its ends to the middle or neck portion of such structure at which point the soft material has a greater cross-sectional area than the permanent magnet material which surrounds the core part at this point, said structure being permanently magnetized with poles of opposite polarity at the peripheries of the large end sections said soft material core part serving primarily to provide an unsaturated path for the greater portion of the permanent magnet flux of the magnet between its pole pieces, the relative dimensions and properties of the different parts being such that the permanent magnet material in the end sections may be substantially fully and efficiently utilized up to its full permanent magnet flux capacity.

5. A permanent magnet structure, including a permanent magnet made of permanent magnet material and having magnetic poles of opposite polarity, said magnet having a non-uniform cross-section throughout the length of its flux path, said magnet having a very materially larger cross-section in the path of its flux at and adjacent its magnetic poles than it has at a point in its flux path between such poles, and means for increasing the flux carrying capacity of the structure through the point of such minimum cross-section comprising magnetic material of materially greater flux carrying capacity than that of which the permanent magnet is made connected in parallel relation with the permanent magnet through its point of minimum cross-section.

6. A permanent magnet structure comprising a permanent magnet made of permanent magnet material, said permanent magnet having pole portions connected by a yoke section the cross-sectional area of the flux path of the pole portions being more than double the cross-sectional area of the flux path of the yoke section and means for causing said permanent magnet to function as such up to substantially the full permanent magnet flux carrying capacity of its pole piece portions, comprising soft magnetic material of relatively high flux carrying capacity per unit of area as compared to that of the permanent magnet material extending between the pole piece portions of said permanent magnet in parallel flux carrying relation with the yoke section thereof.

7. A permanent magnet structure comprising pole piece portions connected by a yoke portion, the pole piece portions being made of permanent magnet material and having a flux-carrying cross-section which is more than double the flux-carrying cross-section of the yoke portion and the yoke section being made partially of such permanent magnet material and partially of a softer magnetic material having a substantially greater flux carrying capacity per unit of area than the permanent magnet material, said soft magnetic material serving to increase the flux carrying capacity of the yoke section substantially up to that corresponding to the permanent magnet flux carrying capacity of the pole piece portions.

FRANK W. MERRILL.